United States Patent [19]

Schinkitz

[11] Patent Number: 5,282,977

[45] Date of Patent: Feb. 1, 1994

[54] SEPARATION OF HEAVY METALS FROM WASTE WATER OF THE TITANIUM DIOXIDE INDUSTRY

[75] Inventor: Dieter Schinkitz, Leverkusen, Fed. Rep. of Germany

[73] Assignee: Kronos, Inc., Hightstown, N.J.

[21] Appl. No.: 950,328

[22] Filed: Sep. 24, 1992

[30] Foreign Application Priority Data

Oct. 1, 1991 [DE] Fed. Rep. of Germany ....... 4132679

[51] Int. Cl.$^5$ ................................................. C02F 1/62
[52] U.S. Cl. .................................. 210/724; 210/726; 210/734; 210/912; 423/55; 423/66; 423/85
[58] Field of Search ............. 210/911, 912, 724, 726, 210/734; 423/80, 84, 85, 66, 55

[56] References Cited

U.S. PATENT DOCUMENTS

| | | | |
|---|---|---|---|
| 2,428,418 | 10/1947 | Goetz et al. | 210/726 |
| 2,530,616 | 11/1950 | Kingsbury et al. | 423/55 |
| 3,544,309 | 12/1970 | Fletcher et al. | 423/55 |
| 4,108,596 | 8/1978 | Hemming et al. | 423/55 |
| 5,009,793 | 4/1991 | Müller | 423/55 |

FOREIGN PATENT DOCUMENTS

| | | | |
|---|---|---|---|
| 293187 | 11/1989 | Japan | 210/912 |
| 1031911 | 7/1983 | U.S.S.R. | 210/912 |

Primary Examiner—Neil M. McCarthy
Attorney, Agent, or Firm—Michael J. Cronin

[57] ABSTRACT

For economical and assured separation of chromium, vanadium and titanium ions from acidic waste waters, which accrue in great quantities in preparation of titanium dioxide, the pH is first raised to around a value of 3 by addition of dolomite brick powder. Directly thereafter, the pH is fine tuned into the range of 4.3 to 4.7 through addition of calcium hydroxide and/or sodium hydroxide, and the hydroxides are separated with the aid of a flocculating agent. Since iron ions and calcium ions remain mainly dissolved in the waste water through such selective precipitation, only a relatively small volume of slush has to be disposed of.

4 Claims, No Drawings

SEPARATION OF HEAVY METALS FROM WASTE WATER OF THE TITANIUM DIOXIDE INDUSTRY

BACKGROUND OF THE INVENTION

The present invention relates a process for separating heavy metal ions from acidic sulfate and/or chloride containing waste water by addition of a magnesium compound and separation of the precipitate.

In the preparation of titanium dioxide according to the sulfate process by hydrolysis of titanyl sulfate solution, dilute acids and waste water accumulate. In addition to sulfuric acid, the accumulation contains the foreign substances contained in titanium ore, especially iron, but also at the very least traces of numerous other metal ions such as chromium, vanadium, aluminum. A part of the dilute acid can be returned directly into the process, in which case the metal ions under any circumstances do not interfere.

Various recovery processes have been developed, on one hand, through which the dilute acid, which contains 20-30% sulfuric acid, is concentrated to 60-70%, and the metal salts of the dilute acid for the most part are precipitated and recovered. See, e.g. DE 27 29 756A for the description of such process. On the other hand, the waste waters in the titanium dioxide preparation and also those which are obtained in the waste acid recovery, cannot as a rule be completely accommodated in the process. They contain relatively few components, e.g. 11 g sulfuric acid, 67 mg iron, and 1.2 mg chromium per liter. An economic recovery is thus not possible and up to now has not been required. Efforts toward the protection of the environment, however, have a present goal of additional lowering of the metal content, particularly chromium, vanadium and titanium, in the waste water of the titanium dioxide industry.

It is, for example, well known from DE 26 18 121A that in liquids which contain both chromium ions and sufficient iron ions, an effective reducing of the chromium ion concentration is possible through addition of lime and precipitation of the hydroxide. If waste waters from the titanium dioxide production are worked up according to this known process, calcium sulfate precipitates in addition to the collective hydroxides, therefore also iron hydroxide, so that a relatively large volume of slush ensues. The components of the slush are, moreover, relatively slowly filterable. Desirably, however, simply precipitation of the heavy metal ions which are undesired in the waste water such as chromium, vanadium and titanium takes place.

U.S. Pat. No. 3,016,286 discloses a two-stage process, in which titanium, aluminum, vanadium and chromium are precipitated by addition of ammonia in a first step, while the other metals still remain in solution. After an oxidation and fresh addition of ammonia in a second step, iron, manganese and magnesium precipitate as hydroxides. The precipitation of the metal ions in the first step is required, because only the separation or the diminishing of aluminum and titanium in the dilute acid leads to an iron oxide, the desired product, which can be filtered with justifiable expense. The goal of this process is to obtain iron oxide piqment and ammonium sulfate. The introduction of ammonia also results in a pH change. This process does not, however, provide encouragement to those skilled in this art for adhering to the lawfully prescribed maximum quantities of certain ions in waste water.

It is known to use magnesium hydroxide (technical grade) in the neutralization of acids. This has been proposed as especially advantageous compared to other industrially used neutralizing agents such as calcium hydroxide or sodium carbonate because, with use of magnesium hydroxide, a better control of the pH is possible, and the neutralization products are not too finely divided so as to be well filterable. Those skilled in this art also know that magnesium hydroxide is considerably more expensive than the known neutralizing agents and its availability is severely restricted.

It has now been found that heavy metal ions can be selectively separated from sulfate or chloride-containing waste water and that, via addition of a mixture of a calcium and magnesium compound, the waste water is pre-neutralized first of all roughly to a pH of around 3 and then a fine tuning of the pH in the range 4.3 to 4.7 follows with a well known neutralizing agent.

By virtue of the process according to the present invention, the elements chromium, vanadium and titanium are separable in a very high measure from the waste waters of the titanium industry via a selective precipitation. Of advantage in this regard is the use of relatively cheap chemicals and the good workability of the "ballast-free" slush containing no calcium sulfate and almost no iron hydroxide.

The natural product dolomite brick powder is an especially suitable calcium and magnesium compound.

In an especially favorable embodiment of the process according to the present invention, the rough adjustment of the pH takes place with the dolomite brick powder and for fine adjustment of the pH, takes place with calcium and/or sodium hydroxide.

A most favorable aspect of the process of the present invention is that, after the rough adjustment has taken place, the subsequent fine adjustment can be carried out at minor retention time.

A flocculatinq agent should be added for improvement of the filterability of the precipitated solids, e.g. a cationically active polyacrylamide.

The process of the present invention is especially suitable for treatment of large quantities of waste water obtained in the preparation of titanium dioxide and requiring a high degree of end purity.

It has been found that the ratio of calcium to magnesium, as it occurs in natural dolomite brick powder, is especially favorable in the chemical for pre-neutralization neutralization in the present invention. It is understood, however, that this ratio need not be exactly observed; for example, one could also use as a suitable product a combination of technical grade magnesium hydroxide and quicklime, in which fluctuations are tolerable.

The mixture of the two basic compounds, magnesium carbonate and calcium carbonate, exhibits, in many respects, advantages in contrast to the use of individual compounds. Where the magnesium portion is too low, this can lead in the case of the waste waters to precipitation of calcium sulfate and, with that, to essentially greater volume of slush for the work up to detriment of the filtration properties. Also a post-precipitation of calcium sulfate, which makes the waste water unsightly in the form of a white turbidity, would not be able to be tolerated on environmental grounds. Too high a portion of magnesium in comparison to calcium would be disadvantageous because of the costs.

As explained below, a waiting time after the addition of the mixture of a calcium compound and a magnesium compound for rough adjustment of the pH range around 3 to the fine tuning is not required. This makes possible a continuous processing method.

Because of the selective precipitation, the second pH adjustment is relatively precisely carried out. Preferably sodium hydroxide and/or calcium hydroxide is used for the fine tuning.

DETAILED DESCRIPTION OF THE INVENTION

The task undertaken is to continuously work up 20 m$^3$ waste water per hour, i.e. to eliminate chromium, particularly via a two-stage process, by way of dolomite brick powder and sodium hydroxide. The water is fed into a 30 m$^3$ tank equipped with stirring and dolomite brick powder administered so that a pH of 2.7 is steadily obtained. With continuous pumping out of the pre-neutralized waste water, 5% solution of sodium hydroxide is administered via a static mixer situated in the pressure piping of the system; the quantity being controlled by a pH measurement behind the mixer. A solution of a flocculating agent is added into the pressure piping via a second static mixer, and the flocculated waste water is carried into a large settling tank having a volume of 300 m$^3$. The bottoms of the settling tank are periodically drained over a filter press and the overflow is returned to the main drainage channel.

EXAMPLE 1

A waste water, which accrues in the washing of titanium dioxide hydrate in a Moore filtering apparatus contains, for instance, 1.7 g sulfuric acid/liter and the following metal ions (all per liter): divalent iron 55 mg, titanium 5 mg, chromium 0.43 mg, vanadium 0.69 mg. The pH is 1.5. Dolomite brick powder is led in with stirring inside of 30 minutes, until a pH of 2.7 is achieved. The dolomite consists of about 45% magnesium carbonate, 54% calcium carbonate, and 1% impurities.

In this example, 1.17 kg dolomite brick powder are used per m$^3$ waste water. Subsequently, the fine tuning or adjusting of the pH with 5% sodium hydroxide solution to 4.6 takes place; 0.22 kg NaOH per m$^3$ waste water is required. It is important that the pH remain stable for a certain time, at least an hour after the end of the treatment, so that no post-precipitation occurs. Titanium, chromium, vanadium and, to a lesser extent, also iron are precipitated as finely divided hydroxides which, after addition of a flocculating agent, e.g. ZETAG R92 (a trademark product of Allied Colloids), settle out quickly and can be filtered off well. No precipitation of calcium sulfate occurs during the neutralization and no post-precipitation of calcium sulfate occurs in the settled out sample.

After the treatment, 41 mg divalent iron, 0.1 mg titanium, less than 0.1 mg chromium and less than 0.1 mg vanadium, per liter of waste water, are still present.

EXAMPLE 2

A more strongly loaded water compared to Example 1, which likewise accrues in the washing of titanium dioxide hydrate, contains (per liter) 3.3 g sulfuric acid and the following metal ions: divalent iron 112 mg, titanium 16 mg, chromium 1.4 mg, vanadium 2.6 mg. The pH is 1.4. With stirring, dolomite brick powder is again led in with stirring up to a pH of 2.7. Here 2.2 kg of dolomite brick powder per m$^3$ waste water are used. Directly at the conclusion of this event, the fine tuning of the pH takes place with 5% sodium hydroxide solution to a pH of 4.5. Here 0.23 kg sodium hydroxide solution/m$^3$ waste water is required. The treatment with the flocculating agent is identical to that in Example 1. After the treatment, 90 mg divalent iron, less than 0.1 mg titanium, less than 0.1 mg chromium and less than 0.1 mg vanadium, per liter of waste water, are still present.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A process for separation of heavy metal ions selected from the group consisting of chromium, vanadium, and titanium ions from waste water accrued in the preparation of titanium dioxide and containing acidic sulfate and chloride, comprising the steps of adding natural dolomite brick powder to the waste water to pre-neutralize the waste water to a pH around 3, adjusting the pH of the waste water in the range of about 4.3 to 4.7 with a neutralizing agent selected from the group consisting of sodium and calcium hydroxide to form a precipitate of the heavy metal ions, and separating the precipitate from the waste water.

2. The process according to claim 1, further including the step of adding a flocculating agent for improvement of filterability.

3. The process according to claim 2, wherein the flocculating agent is an electrolyte.

4. The process according to claim 3, wherein the electrolyte is a cationically active polyacrylamide.

* * * * *